United States Patent [19]

Bosche

[11] 4,072,089

[45] Feb. 7, 1978

[54] TWO STATION SONIC SEALING APPARATUS AND METHOD

[75] Inventor: Eugene R. Bosche, Plymouth, Mich.

[73] Assignee: Ex-Cell-O Corporation, Troy, Mich.

[21] Appl. No.: 690,221

[22] Filed: May 26, 1976

[51] Int. Cl.$^2$ .............................................. B31B 1/66
[52] U.S. Cl. .......................... 93/44.1 GT; 93/44.1 R; 93/DIG. 1; 156/73.1; 156/580.1
[58] Field of Search ................... 53/39, 323, 374, 375, 53/DIG. 2; 93/44.1 R, 44.1 GT, DIG. 1; 156/73.1, 580.1

[56] References Cited

U.S. PATENT DOCUMENTS

| | | | |
|---|---|---|---|
| 3,166,994 | 1/1965 | Egleston | 93/44.1 R |
| 3,183,801 | 5/1965 | Egleston | 93/44.1 GT |
| 3,239,995 | 3/1966 | Monroe et al. | 53/375 |
| 3,905,280 | 9/1975 | Egleston et al. | 93/44.1 R |
| 3,956,046 | 5/1976 | Tsuchiya et al. | 53/39 X |
| 3,958,501 | 5/1976 | Richards | 93/44.1 R |

Primary Examiner—Roy Lake
Assistant Examiner—Paul A. Bell
Attorney, Agent, or Firm—Reising, Ethington, Barnard, Perry & Brooks

[57] ABSTRACT

Apparatus for forming a seal between layers of a carton of thermoplastic coated paperboard material and the like wherein the thermoplastic material in the area to be sealed serves as the sealant and is activated to flow by frictional heat generated by a vibration welding horn and is then allowed to cool and set under pressure to form the seal between the layers. The carton first moves to an activating station wherein the layers to be sealed are engaged on opposite surfaces by a vibrating horn and a back-up means for a time sufficient to activate the thermoplastic material to flow. The carton is then carried to one or more clamping and sealing stations at a different location from the activating station with the thermoplastic material in the activated state. The layers to be sealed with the activated thermoplastic is then engaged on opposite surfaces by a pressure pad and a back-up means for a predetermined period of time to permit the activated thermoplastic to cool and set and form a seal.

26 Claims, 9 Drawing Figures

TWO STATION SONIC SEALING APPARATUS AND METHOD

BACKGROUND OF THE INVENTION

1. Field of the Invention

This invention relates generally to packaging methods and apparatus, and is particularly concerned with a method and apparatus for forming a seal between layers of a carton of thermoplastic coated paperboard material and the like wherein the thermoplastic material of the layers is activated by frictional heat from a vibration welding horn and then allowed to cool and set under pressure to form a seal between the layers.

2. Description of the Prior Art

The type of container with which the present invention is particularly (but not exclusively) concerned is the type made of paperboard stock coated on both sides with a thermoplastic material such as polyethylene. The thermoplastic coating is utilized not only as moisture proofing material, but also serves as an adhesive which cooperates in sealing the seams, joints and closure elements of the container so as to make the container fluid tight when it is filled with milk or other contents, and sealed and closed. An example of this general type of container is disclosed in U.S. Pat. Nos. 3,120,089; 3,309,841 and 3,910,014.

Until recently, the conventional manner of sealing thermoplastic coated paperboard cartons was to activate the thermoplastic coating, by the application of heat, to cause it to flow at the portions to be joined and sealed, and then bring the layers of the end closures into contact with each other. When the thermoplastic material between the layers cools and sets, the layers are sealed and fused together. In addition to requiring the use of elaborate and expensive apparatus for generating the considerable amount of energy required, elaborate apparatus, methods and systems are also required to dissipate the heat from the plant in which the packaging operation is being carried out. Examples of this general type of packaging apparatus are shown in U.S. Pat. Nos. 3,002,328; 3,120,089; 3,166,994; 3,187,647; 3,239,995; and 3,309,841.

U.S. Pat. Nos. 3,905,280 of Sept. 16, 1975 and 3,910,014 of Oct. 7, 1975 disclose apparatus for sealing the end closures and side seams of thermoplastic coated paperboard containers by vibration welding wherein mechanical energy is converted into localized heat energy to minimize the amount of heat and energy required, and to eliminate the necessity for expensive systems and methods for dissipating the excess heat. U.S. Pat. No. 3,526,792 discloses an ultrasonic transducer having a converter for converting electrical energy into mechanical energy, and a concentrating horn for concentrating the mechanical energy into vibrations at a desired frequency. In the above mentioned U.S. Pat. Nos. 3,905,280 and 3,910,014, the horn vibrates a predetermined frequency when energized, and cooperates with an anvil or other back-up means to clamp the layers of the thermoplastic coated paperborad between the working surface of the horn and back-up or work surface of the anvil. When the thermoplastic coated paperboard layers are claimed between the work surfaces of the horn and anvil, vibration of the horn creates frictional heat sufficient to activate the thermoplastic coating of the layers to cause the thermoplastic material of the layers to flow together. When the vibration is terminated, the thermoplastic will cool and set to form a seal between the layers and to adhesively secure the layers together throughout the area of the seal.

There are two stages in the sealing operation of thermoplastic coated paperboard containers by vibration welding. These stages are: (1) the activation stage in which the friction of the vibrating horn generates heat sufficient to activate the thermoplastic coating, and (2) the cooling stage wherein the layers are clamped together to permit the previously activated thermoplastic coating to cool and set to form the seal.

A significant factor in determining the production rate is the amount of time required in the sealing operation. Present practice is to utilize the horn in both the activation and cooling stages. When the horn is used in both stages, a complete cycle of forming a seal between the layers of the carton involves (1) bringing the working surfaces of the anvil (or backup means) and horn into opposed relationship on opposite sides of the layers to be joined and sealed, (2) activating the thermoplastic coating of the layers between the work surface by the frictional heat of the energized horn to cause the coating of the layers to flow together, (3) permitting the previously activated thermoplastic material to cool and set while still held between the working surfaces of the anvil and deenergized horn, and (4) separating the working surfaces of the anvil and horn to remove the carton layers after the seal has been formed. The time involved per cycle to date has been in the range of approximately one-half to two seconds, or more, depending upon the thickness of the paperboard, the thickness of the thermoplastic coating, the number of layers, and the surface area to be sealed.

A significant cost factor in the apparatus is the vibrating horn utilized to activate the thermoplastic coating. It has been conventional in vibration welding operations of this type to pressure actuate the horn to start the horn vibrating. As the working surface of the horn moves into contact with the layers of the carton to be joined together, the horn starts vibrating when a predetermined pressure on the working surface of the horn is sensed by the horn actuating controls. In a high production packaging system, the available time for the sealing operation is determined primarily by the speed at which the cartons must pass through the welding cycle as determined by the speed of other machines in the total system. For example, the welding apparatus must be incorporated into a system including machines for feeding and erecting cartons from flat blank form, such as machines of the type disclosed in Allen U.S. Pat. Nos. 3,599,541 of Aug. 17, 1971 and in Kellogg U.S. Pat. No. 3,937,131 of Feb. 10, 1976, and filling and closing apparatus such as disclosed in Braun U.S. Pat. No. 3,910,014.

A significant expense involved in packaging systems using vibration welding is the cost of each vibration welding horn, as well as the power requirements for energizing the horn. Furthermore, the horn must be mounted with respect to the anvil or back-up means for movement between extended and retracted positions to permit the cartons to move past the horn after completion of a welding cycle.

In the type of operation described above, the horn is inactive during a significant portion of the welding cycle. The greater the number of vibration welding horns required, the greater the power requirements for the packaging operation. Furthermore, extension and retraction of the horn for a significant distance, plus pressure actuation of the horn, requires a significant amount of time in a mass production operation.

When the end closures of a thermoplastic paperboard carton are closed, and sealed, it is desirable to "stake" the layers at certain locations. By "staking" is meant that indentations are pressed into the overlapping layers at strategic locations to, in effect, form localized dams to close off likely leak paths between the layers. The indentations are pressed into the carton layers by protrusions from the surfaces of clamping devices used in the closing and sealing operation. It is not possible to provide staking protrusions in the surface of either the vibration welding horn or the anvil or mandrel against which the horn presses the paperboard layers, for the reason that burning would take place during the vibration welding operation at such protrusions. Thus, although staking is desirable to reduce the occurrence of leak paths, it has not been possible to combine a staking operation with a vibration welding operation.

SUMMARY OF THE INVENTION

An object of this invention is to provide a method and apparatus for forming a seal between layers of thermoplastic coated paperboard material and the like by vibration welding wherein the vibration welding horn is utilized only to activate the thermoplastic material so as to more efficiently utilize the vibration welding horn.

A further object is to provide a method and apparatus for closing and sealing the end closures of cartons of thermoplastic coated paperboard material or the like wherein the thermoplastic coating is activated at an activating station by vibration welding at one location, and the layers with the activated thermoplastic are then moved to a clamping and sealing station at another location where the layers are clamped together until the activated thermoplastic cools and sets to form a seal, and the layers are staked simultaneously.

The foregoing, and other objects, are achieved in accordance with the present invention by performing the activation stage and cooling stage of a vibration welding operation at different locations. Each carton is first placed in position at a sealant activating station. A vibration welding horn is located at the activating station. The layers of the carton to be sealed are clamped between the working surfaces of the horn and back-up means located at the activating station so that the vibration of the horn activates the thermoplastic. Preferably, the end closures of the carton are first subjected to the action of a preclosing unit which operates to pre-press or bend the end closure panels to their fully closed conditions along the respective score lines. The preclosing action preferably takes place just prior to movement of the carton to the sealant activating station. In the preclosing operation, the end closure panels are folded and pressed to their fully closed position with a pressure sufficient to, insofar as possible, create permanent set in the paperboard and its thermoplastic coating. The preclosing action thereby reduces the work required by the horn in closing the end closure panels.

The carton is then carried to a clamping and sealing station at a location different from the activating station. The layers to be sealed, with the activated thermoplastic material, are clamped between the work surfaces of a pressure pad and a back-up means at the cooling station for a predetermined period of time to permit the activated thermoplastic material to cool and set and form a seal between the layers. The pressure pad and back-up means may also simultaneously stake the layers at preselected locations. The cartons can move at a greater rate of speed through the activating station, and the horn can remain energized throughout all or a greater portion of the welding cycle; if desired, the horn can vibrate continuously and retract a distance sufficient only to permit the cartons to move from the activating station after the thermoplastic material has been activated by the vibrating horn.

Other objects, advantages and features of the invention will become apparent from the following description taken in connection with the accompanying drawings.

DESCRIPTION OF THE PREFERRED EMBODIMENTS

Figure 1:
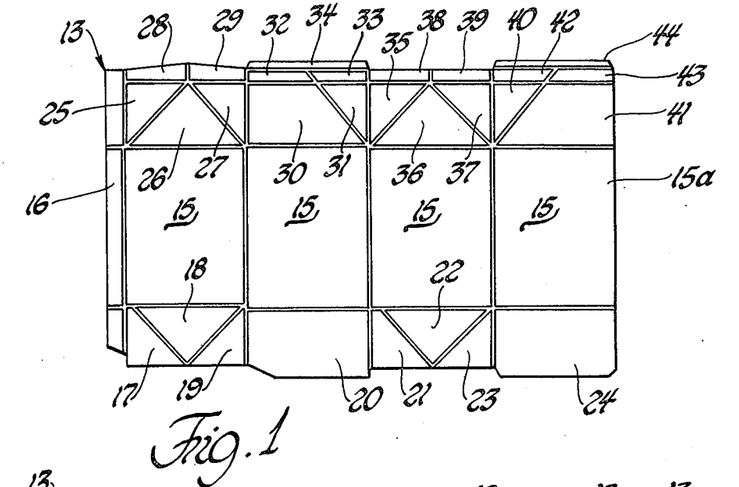
FIG. 1 is a plan view of a conventional thermoplastic coated paperboard blank for use in forming a container of the type that can be erected, filled and sealed in accordance with the apparatus and method of this invention.
Figures 2, 3, 4, 5:
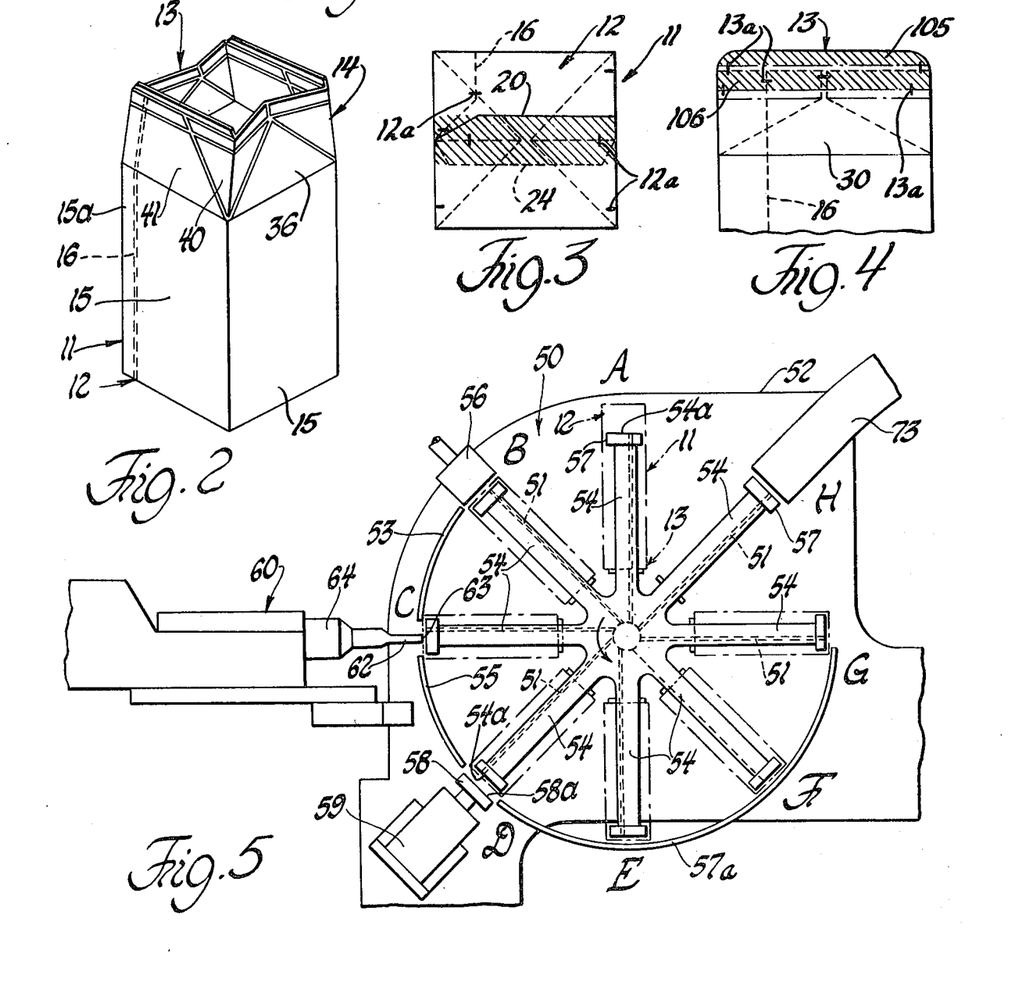
FIG. 2 is a perspective view of a container formed from the blank of FIG. 1 with the gabled end closure portion in the open, unsealed position after a conventional prebreaking operation.
FIG. 3 is a bottom plan view of the container illustrating one sealing pattern of the flat end closure of the illustrated container.
FIG. 4 is a side elevational view of the gabled top end closure portion of the container of FIG. 2 in its closed sealed condition.
FIG. 5 is an elevational view of packaging apparatus incorporating the invention at the container flat end closure closing station thereof.

In the drawings, reference numeral 11 collectively designates the container in its erected condition in FIG. 2, the container being made from the blank of FIG. 1. The container blank of FIG. 1 is preferably made up of paperboard provided with a thermoplastic coating such as polyethylene on both sides.

As shown in FIG. 2, the container 11 is in the form of a tubular body of rectangular cross-section having end closures 12 and 13 at opposite ends of the tubular body. In the illustrated embodiment, the end closure 12, in its closed condition is flat and constitutes the container bottom, while the end closure 13 is located at the upper end of the container body and is of gabled configuration. The top end closure 13 is formed with an extensible pouring spout 14 for use in dispensing the contents of the container 11.

The container of FIG. 2 is formed from the blank of FIG. 1, the blank being divided into a plurality of panels which are adapted to form the walls and the closure members of the container. The panels are formed by score lines. The body portion of the container 11 is formed by four side panels 15, which panels are secured together by a side flap 16.

The bottom closure portion 12 is formed from the various rectangular and triangular panels 17, 18, 19, 20, 21, 22, 23 and 24. When the carton is folded along the score lines between the side panels 15, and the sealing flap 16 is welded to the inner surface of one of the side panels 15 as illustrated in FIG. 2, the triangular panels 18 and 22 are folded inwardly with the panels 17 and 19 overlying the panel 18, and the panels 21 and 23 overlying the panel 22. The edge of the panel 24 is then inserted beneath the edge of the panel 20 in the space between the panel 20 and the panels 19 and 21 to form the flat bottom 12 which is illustrated in bottom plan view in FIG. 3. The bottom is sealed and staked as shown in FIG. 3 by the apparatus shown in FIG. 5 in the manner set forth in greater detail below.

The top end closure 13 of the container 11 is formed with a pair of roof panel members which are inclined upwardly in the completed position and between which are disposed the inner triangular panels 26 and 36. One of the roof panel members is formed with the panels 30 and 31, and the other of the roof panel members is formed from the panels 40 and 41. A pair of triangular fold-back panels 25 and 27 are disposed on opposite sides of the inner triangular panel 26, and similarly, a pair of triangular fold-back panels 35 and 37 are disposed on opposite sides of the inner triangular panel 36. The inner triangular panel 36 and the adjacent fold-back panels 35 and 37 function as an extensible pouring spout 14 after the top end panels have been closed. The closure panels 25, 26 and 27 are provided on the upper end thereof with inner rib panels 28 and 29. The inner closure panels 35, 36 and 37 are provided with inner rib panels 38 and 39 on the upper ends thereof. The outer closure panels 30, 31, 40 and 41 are provided on the upper ends thereof with outer rib panels 32, 33, 42 and 43, respectively. The outer rib panels 32 and 33 are provided with an upwardly extending sealing panel 34. The outer rib panels 42 and 43 are provided with an upwardly extending sealing panel 44.

Figure 6:
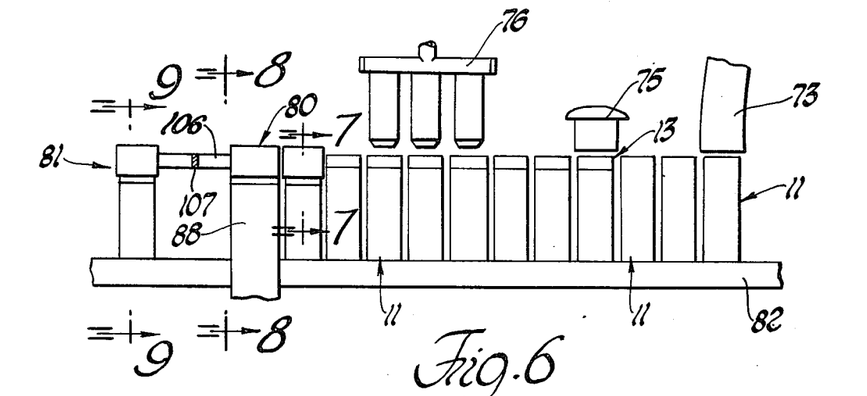
FIG. 6 is a side elevational view of a portion of apparatus for sequentially prebreaking the top end closure of the containers, filling the container, closing and prepressing the top end closures, vibration activating the thermoplastic to flow, and then clamping the top end closure to permit the activated thermoplastic to cool and set to form a seal.
Figure 7:
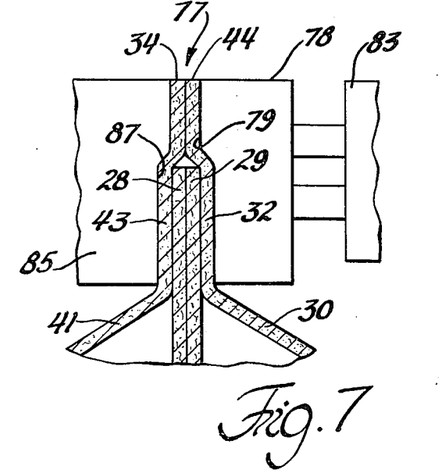
FIG. 7 is a sectional view taken on lines 7—7 of FIG. 6 with the top breaking unit illustrated in its operable position to prebend the top end closure panels.
Figure 8:
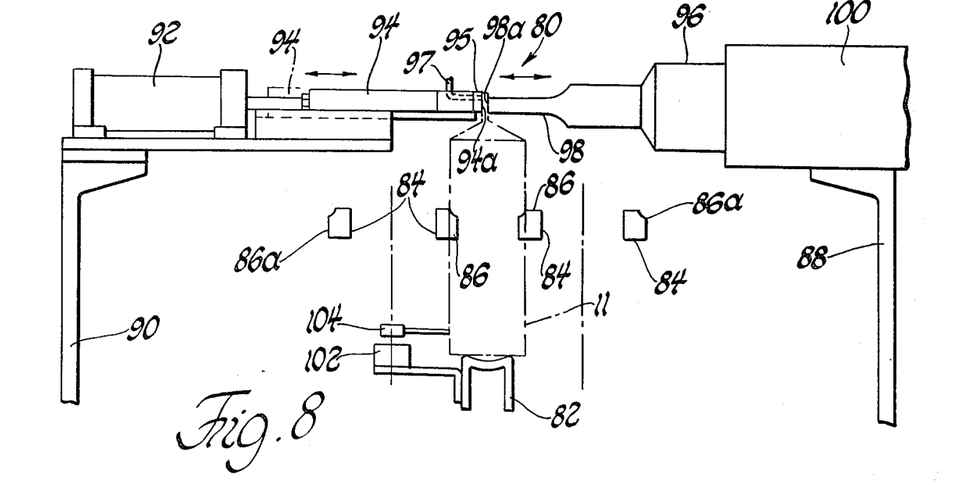
FIG. 8 is a view taken along lines 8—8 of FIG. 7; with the vibration welding horn in the operable position; and, FIG. 9 is a sectional view taken on lines 9—9 of FIG. 6 with the pressure pad and back-up means illustrated in their clamping positions.
Figure 9:
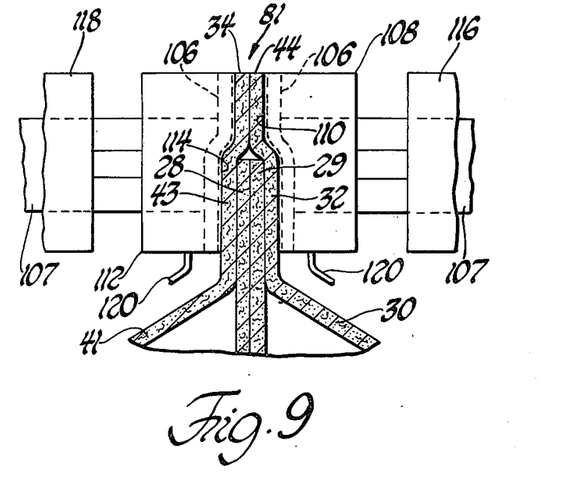

As shown in FIGS. 4, 7 and 9, the top end closure 13 is closed and sealed by welding the opposed surfaces of the sealing panels 34 and 44 together as well as the opposed surfaces of the panels 28, 29, 32 and 43 together by heating the thermoplastic coating on the opposed surfaces to cause the coatings of the panels to flow together so that the panels will be welded together upon cooling of the thermoplastic coatings. The welding and sealing operation of the top end closure is carried out by the apparatus of FIGS 6, 7, 8 and 9 in the manner set forth in detail below.

FIG. 5 illustrates a rotatable mandrel assembly 50 supported on a frame 52. The mandrel assembly 50 includes a plurality (in this case, eight) of radially extending arms, or mandrels 54. Each mandrel 54 serves as an anvil or back-up means for a vibrating horn at a sealant activating station and for a pressure pad at a clamping and cooling station in a manner described in greater detail below.

The mandrel assembly 50 is intermittently driven to rotate in a counterclockwise direction as viewed in FIG. 5 so that each arm or mandrel 54 sequentially moves from a loading station at position A, a bottom or flat end closure breaking or preclosing station at position B, a sealant activating station at position C, a clamping and cooling station at position D, and from position D through positions E, F and G to an unloading or transfer station at position H.

Located at position is a breaker or preclosing unit designated collectively by reference numeral 56 for folding the panels of the bottom closure portion 12 to the closed condition illustrated in FIG. 3. The bottom breaker unit 56 is diagrammatically illustrated in FIG. 5 and may be of the construction shown in U.S. Pat. No. 3,239,995. Similarly, the rotatable mandrel assembly 50 may be of the same construction as that shown in the apparatus disclosed in U.S. Pat. Nos. 3,239,995 and 3,905,280.

As is disclosed in the aforementioned U.S. Pat. No. 3,239,995, the cartons 11 may be loaded onto apparatus in flat blank form with the sealing flap 16 already adhesively secured to the inner surface of the appropriate side panel 15 to form the side seam between side edges 15a and 16. The flattened, closed blank, is then formed into tubular configuration by apparatus such as that disclosed in U.S. Pat. No. 3,239,995, and the tubular cartons with both the bottom and top closure portions 12 and 13 in the fully open positions, are sequentially loaded onto the mandrel 54 located at position A with the top closure portion 13 disposed downwardly toward the axis of rotation of the rotatable mandrel assembly 50, and the bottom closure portion 12 projecting radially outwardly from the outer end of the mandrel 54.

When a carton is loaded onto the mandrel 54 at position A, the assembly 50 is indexed to rotate in a counterclockwise direction (as viewed in FIG. 5) to carry the mandrel 54 formerly located at position A to position B. When a loaded mandrel 54 is moved from position A to position B, the bottom breaker indicated schematically at 56 in position B folds the bottom panels 17–24 to the closed position shown in FIG. 3 in the manner described in U.S. Pat. No. 3,239,995 as well as U.S. Pat. No. 3,120,089. The panels are folded along the score lines and the bottom breaker unit 56 operates to effect substantial prebending of the bottom closure panels on their respective score lines to their closed position. The prebending action is carried to a sufficient extend to create along each score line, insofar as possible, a permanent set in the paperboard and its thermoplastic coating.

The end 54a of each of the mandrels 54 have a shape corresponding to the closed bottom 12 of the container 11, and constitutes a work surface engaging one surface of the layers to be sealed at the activating and cooling stations. Thus, each of the mandrel arms 54 serves as a back-up means for the welding and sealing operation that takes place at positions C and D as described below.

When a carton 11 is moved from position B to position C with the bottom closure portion 12 in its folded and closed condition, it is disposed in opposed relationship to a vibrating horn 62 having a work surface 63 at its outer end. The horn is operable to engage the outer surface of the layers of the bottom panels with the work surface 63. The mechanical energy of the vibrating horn 62 is converted into frictional heat to activate the thermoplastic coating of the layers of the carton received between the work surface 63 of the horn and the work surface 54a of the back-up mandrel 54. A hold-down rail 53 extends between positions B and C and engages the folded closed end closure 12 and maintains it in its closed position until it reaches the activating station at position C. A second hold-down rail 55 extends from position C to position D to hold the end closure layers flat (in the position shown in FIG. 3) as the carton moves from the activating station at position C to the clamping and sealing station at position D. The rail 55 may be heated to prevent the activated thermoplastic coating from cooling and setting before the carton reaches position D. A hold-down rail 57 extends from positions D to G to prevent the containers from falling off the respective mandrels 54. The vibrating horn 62, as illustrated in FIG. 5, is also in the form of a concentrating horn of an ultrasonic transducer of the type shown in U.S. Pat. Nos. 3,432,691 and 3,526,792. The transducer 60 includes a housing 64 for a converter for converting electrical energy into mechanical energy, and the concentrating horn 62 converts the mechanical energy into vibrations at a desired frequency.

The concentrating horn 62 is shown in its extended, operable position for engaging one outer surface of the layers of the bottom 12 of the carton with the work surface 63. The mandrel 54 at position C serves as a back-up means with its work surface 54a engaging the opposite outer surface of the layers of the bottom 12. The horn 62 is movable from its extended active position to a retracted inactive position with respect to the position of the mandrel 54 at position C. Thus, the mandrels 54 are each movable from the active position at position C, to inactive positions with respect to the active position of the horn 62. Conversely, the horn 62 is reciprocably movable from the active position shown in FIG. 5 with respect to the mandrel at position C, to an inactive retracted position to the left of the position shown in FIG. 5 to unclamp the carton from between the work surfaces 63 and 54a to permit the carton to move from the activating station.

The shape and configuration of the horn is determined in accordance with the dresired frequency of vibration to produce the desired amount of concentrated, frictional heat at the area to be welded together. For example, the horn 62 may be designed to vibrate at a frequency of 20,000 cycle per second when its work surface 63 is in engagement with the outer surface of the bottom 12. The vibration of the horn 62 is converted into frictional heat which activates the thermoplastic coating of the layers of the panels making up the bottom 12 along the band 68 indicated by the shaded area in FIG. 3. Alternatively, the bottom can be sealed in an H-shaped pattern as illustrated in U.S. Pat. No. 3,905,280, in which case the horn 62 may be of H-shaped cross-section.

In the illustrated embodiment of FIg. 5, each mandrel 54 is formed with cooling chambers in their outer ends 57. The cooling chambers are connected with a source of water, or other cooling liquid or fluid, through passages indicated by reference numerals 51. The constructions of the mandrels 54, cooling chambers and passages may be the same as that disclosed in U.S. Pat. Nos. 3,120,089 and 3,239,995, for example.

When a carton with the activated thermoplastic coating at the layers of the end closure 12 reaches position D, it is clamped between the work surface 58a of a pressure pad 58 and the work surface 54a of the mandrel. The layers of the end closure 12 are clamped between the work surfaces 54a and 58a for a predetermined period of time to permit the activated thermoplastic to cool and set. The layers are pressed together between the work surfaces 54a and 58a to cause the activated thermoplastic of the different layers to flow together along the band 68 to adhesively secure the layers together and form a seal when the activated thermoplastic cools and sets between the work surfaces.

The pressure pad 58 is in the form of a piston head reciprocably mounted in a cylinder 59. The pressure pad 58 is actuated by air, or other fluid pressure in the cylinder 59 between an extended active position in which the opposed work surfaces 58a and 54a of the pressure pad and back-up means, respectively, engage the layers of the end closure 12 in a clamping relationship, and a retracted, inactive position relative to the mandrel or back-up means to unclamp the carton end closure 12 from between surfaces 54a and 58a. Alternatively, the pressure pad may be actuated between positions mechanically, such as by cams, levers, or springs. Electrical actuators may also be used instead of pneumatic or hydraulic actuators.

The work surface 58a of the pressure pad 58 may be formed with staking protrusions (not shown) for staking the bottom end closure. The staking protrusions on the work surface 58a indent the paperboard and cause the outer layers of paperboard to protrude partially into the inner layers. The indentations are indicated in FIG. 3 by reference numeral 12a, seven such indentations being shown in FIG. 3. The indentations 12a are formed in the overlapping layers at locations where leakage is likely to occur between the layers.

When a container moves from position D through positions E, F and G, a hold-down rail 57a prevents the containers from falling off the mandrels. When a container reaches the unloading position H in FIG. 5, it is transferred through a guide chute 73 to a conveying assembly illustrated in FIGS. 6 and 8. The container may be removed from the mandrel 54 at position H, and propelled through the chute 73 by pneumatic pressure, or in the manner disclosed in U.S. Pat. No. 3,239,995. The conveying assembly moves the containers 11 from the discharge end of the chute 73 at the right-hand end of FIG. 6 sequentially through a top prebreaking mechanism indicated diagrammatically by reference numeral 75, a filler assembly 76, a top preclosing or prebending station 77, a sealant activating station 80, and a clamping and cooling station 81. The top prebreaking unit 75 and filler assembly 76 are also disclosed in the aforementioned U.S. Pat. No. 3,239,995, and their particular structural details form no part of the present invention.

The conveying assembly of FIGS. 6 and 8 includes an elongated support member 82 for supporting the cartons as the cartons are moved along the conveying lines by endless conveyor chains 84 (FIG. 8), the conveyor chains having fingers 86 for engaging the containers 11 to move the containers 11 along the support 82. The fingers 86a in FIG. 8 indicate the fingers of the return runs of the conveyor chains 84. The conveyor assembly may be identical to the conveyor assembly of the apparatus shown in either of U.S. Pat. Nos. 3,120,089 and 3,309,841; or 3,239,995. The conveyor chains are omitted from FIG. 8 for clarity of illustration.

As each container 11 advances toward the activating station 80, it is sequentially subjected to the operation of the top prebreaker 75 which operates to bend the panels of the open gabled closure portion 13 inwardly to approximately the position shown in FIG. 2, and the filling assembly 76 wherein the carton is filled with milk or other contents.

With reference to FIG. 7, located at the preclosing station 77 is a preclosing pressure pad 78 and an anvil or other back-up member 85. The pressure pad 78 and anvil 85 have opposed work surfaces 79 and 87, respectively. The work surface 79 of the pressure pad 78 engages one outer surface of the layers of the top end closure, and the work surface 79 engages the opposite outer surface.

The pressure pad 78 in the illustrated embodiment of FIG. 7 is in the form of a piston mounted in a cylinder 83 for movement between a retracted, inactive position spaced from the anvil 85 and out of engagement with the carton layers, and the extended, active position illustrated in FIG. 7. In the extended, active position, the panels 25-44 of the top end closure 13 are pressed to the closed condition between the work surfaces 79 and 87. The pressure exerted between the work surfaces 79 and 87 is sufficient to effect permanent set in the score lines and panels of the top end closure 13 tending to cause it to remain in the closed condition shown in FIG. 7. Conseqently, when the carton moves into the activating station 80, the enclosure is already substantially in its closed condition so that little, if any, closing movement is required at the activating station 80 by the horn 98.

The anvil 85 is shown as being fixedly mounted in the position illustrated in FIG. 7 to serve as a back-up means for the extendable and retractable preclosing pressure pad 78. However, both the preclosing pressure pads 78 and anvil 85 may be extendable and retractable, provided stops are provided to maintain the work surfaces 79 and 87 centered in their extended, clamping positions shown in FIG. 7.

The work surfaces 79 and 87 are stepped so as to have a surface complementary to the outer surfaces of the layers of the end closure 13 to more effectively apply the pressure between the work surfaces 79 and 87 to achieve permanent set of the end closure toward its closed condition.

Located at the activating station, on opposite sides thereof, are support members 88 and 90 for respectively supporting a sonic welding assembly 96 and an anvil assembly 92. The anvil assembly 92 includes an anvil member 94 which is extendable to an operable positon shown in full lines in FIG. 8 and is retractable to an inoperable position with respect to the sonic welding assembly as illustrated in the phantom line position in FIG. 8. The sonic welding assembly 96 includes a concentrating vibration horn 98 which is extendable to an active position as shown in FIG. 8 and is retractable to an inactive position located to the right of the position shown in FIG. 8. While the illustrated anvil 94 is extendable and retractable, it will be desirable in many systems that the anvil be supported in a stationary or fixed position.

The horn 98 has a work surface 98a for engaging one outer surface of the paperboard layers of the top closure portion 13 of the carton 11. The anvil 94 has a work surface 94a in opposed relationship with the work surface 98a for engaging the opposite outer surface of the paperboard layers of the top closure portion 13.

The horn 98 and anvil 94 are caused to move between their respective active and inactive positions by control means operated by a switch 102 having an actuator 104 engageable by a container 11 when the container 11 is in the welding station. When a container 11 is not located at the activating station 80 in the position shown in FIG. 8, the anvil 94 and horn 98 are caused to retract to their inactive positions wherein the anvil 94 is located to the left of its full line position to its phantom line position in FIG. 8, and wherein the horn 98 is retracted to the right of the position in which it is shown in FIG. 8. In the retracted positions, the work surfaces 94a of the anvil and horn, respectively, are spaced from each other a distance so as not to apply clamping force on the carton top end closure 13. When a container 11 is moved by the conveyor 84 to the activating station 80, the container engages the actuator 104 which causes the work surface 98a of the horn 98 to engage one outer surface of the layers of the top closure portion of the container on the right-hand side as viewed in FIG. 8, and the work surface 94a of the anvil 94 to extend toward the right to engage the other outer surface of the layers of the top closure portion of the container. Actuation of the switch 102 by the actuating arm 104 when engaged by the container 11 energizes the horn 98 to vibrate and generate frictional heat along the shaded bands 105 and 106 in FIG. 4.

As shown in FIG. 9, the configuration of the top closure portion of the container 11 is such that the ribs 34 and 44 form a double layer, while the panels 28, 29, 32 and 43 form four layers to be welded together. Moreover, at the area of the sealing flap 16, a fifth layer is formed which must be sealed together. Consequently, either of the work surfaces 94a or 98a of the anvil and horn, or both, in the area of the sealing flap 16 may be relieved to accommodate for the extra thickness so that uniform pressure will be applied between the horn and the anvil during the welding operation.

The anvil 94 is also provided with a cooling chamber in the end portion 95 connected with a source of water or other cooling liquid or fluid by a conduit 97, which may be flexible to permit movement of the anvil 94.

The anvil 94 may be a single piece anvil with the work surface 94a stepped such that its configuration accommodates the changing contour from rib 34 to panel 43. Similarly, the work surface 98a of the horn 98 may have a shape conforming to the changing contour from rib 44 to panel 32 due to the extra thickness between the panels 32 and 43 because of the panels 28 and 29 being sandwiched between panels 32 and 43.

Extension and retraction of the anvil 94 and horn 98 may be accomplished be conventional hydraulic or electrical actuators controlled in such a manner that when a carton 11 is not in engagement with the actuator 104, the anvil 94 and horn 98 are actuated to their retracted, inactive positions. When the carton 11 engages the actuator 104, the anvil 94 is caused to extend to the full line position in FIG. 11, the horn 98 extends to the position shown in FIG. 11 and is energized to vibrate. The horn vibration is converted into frictional heat to activate the thermoplastic coating of the paperboard layers of the top closure portion 13 along the bands 105 and 106 of FIG. 4. With the horn vibrating at a frequency of approximately 20,000 cycles per second (or 20K Hz), sufficient heat is generated in a matter of milliseconds to activate the thermoplastic.

While the anvil 94 as illustrated in FIG. 8 as being extendable and retractable, the anvil can be stationary such that the work surface 94a does not move with respect to the work surface 98a of the horn. The horn 98 will retract toward the right from the position shown in FIG. 8 a distance sufficient to unclamp the layers of the top end closure 13 along the bands 105 and 106 to permit the carton to move from the activating station. The horn 98, in either case, can vibrate continuously as the cartons 11 are fed by the conveyor chains 84 through the activating station 80. Each time a carton moves into the activating station, the horn will extend from its retracted position to engage the work surface 98a with the layers of the top end closure portion 13 of the carton for a predetermined period of time sufficient to activate the thermoplastic coating of the layers clamped between the work surfaces 94a and 98a.

Extending between the activating station 80 and the clamping and sealing station 81 is a pair of spaced, parallel holding bars 106 (FIGS. 6 and 9). Holding bars 106 are mounted on support members 107 extending to other support structure of the apparatus. In the illustrated embodiment, as shown in FIG. 9, the holding bars 106 have a configuration complementary to the outer contours of the closure portion 13 and engage the outer surfaces of the sealing panels 34 and 44 and the outer surfaces of the panels 32 and 43 along the bands 105 and 106. The holding bars 106 prevent separation of the layers with the activated thermoplstic coating during the time that the carton moves from the activating station 80 to the clamping and sealing station 81. The holding bars 106 may be heated sufficiently to prevent the thermoplastic coating that has been activated by the horn 98 at station 80 from cooling and setting before the carton reaches the clamping and sealing station 81.

With reference to FIG. 9, located at the clamping and sealing station is a pair of opposed pressure pads 108 and 112. The pressure pads 108 and 112 have opposed work surfaces 110 and 114, respectively. One of the pressure pads may be considered as a back-up means for the other pressure pad. The work surface 110 of the pressure pad 108 engages one outer surface of the layers in the area to be sealed, the same area along bands 105 and 106 having activated thermoplastic from the activating station 80. The work surface 114 engages the opposite outer surface.

The pressure pads 108 and 112, in the illustrated embodiment of FIG. 9, are in the form of pistons mounted in cylinders 116 and 118, respectively for movement between retracted, inactive positions out of engagement with the carton layers, and the extended, active position illustrated in FIG. 9. In the extended, active position, the layers to be sealed are clamped between the work surfaces 110 and 114. When the carton moves into the clamping and sealing station from the activating station 80, the cylinders are actuated to cause the work surfaces 110 and 114 to engage the opposite outer surfaces of the layers along bands 105 and 106 (FIG. 4) to clamp the layers together for a predetermined period of time sufficient to permit the activated thermoplastic to cool and set and form a seal between the layers. At the end of the predetermined period of time, the pressure pads retract.

In FIG. 9, as alluded to above, both of the pressure pads 108 and 112 are indicated as being extendable and retractable. If two movable pressure pads 108 and 112 are used as illustrated in FIG. 9, a limit stop or other means for at least one of the cylinders 116 and 118 must be provided to prevent the cartons from being pushed off center when the pads 108 and 112 are in the clamping position shown. Alternatively, one of pressure pads can serve as a stationary back-up means thus eliminating the necessity for one of the cylinders. For example, the pressure pad 112 may be fixedly mounted in the position illustrated in FIG. 9 to serve as a stationary back-up means for the extendable and retractable pressure pad 108.

In the illustrated embodiment of FIG. 6, the work surfaces 110 and 114 are stepped so as to have a surface complementary to the outer surfaces of the carton layers along bands 105 and 106 to more evenly distribute the pressure between the work surfaces 110 and 114.

The pressure pads 108 and 112 may be hollow to provide a cooling chamber in their interiors, which cooling chambers may be connected with a source of water or other cooling fluids by conduits 120, which may be flexible to permit the extended and retracted movement of the pressure pads.

The work surfaces 110 and 114 may be formed with staking protrusions (not shown) for staking the top end closure during the clamping and sealing operation. As previously described in connection with the pressure pad 58, the staking protrusions on the work surface 110 and 114 indent the paperboard and cause the outer layers to protrude partially into the inner layers. The indentations on the top end closure 13 are indicated by reference numerals 13a in FIG. 4. Six indentations 13a are shown in FIG. 4, the indentations being pressed into the closure from opposite sides by the work surfaces 110 and 114.

A separate conveyor may be utilized to move the cartons from the activating station to the clamping and sealing stion at a faster speed than the conveyor used to convey the cartons to the activating station. Furthermore, rotary conveyors or the like can be used to alternately move cartons from the activating station to different clamping and sealing stations when the clamping and sealing operation requires a greater amount of time than the activating operation. In either case, the invention permits more efficient use of the vibrating horn and reduces the overall power requirements of the packaging operation.

In the illustrated embodiment, the first horn 62 is located at a bottom end closure activating station C, and position D is the bottom end closure clamping and sealing station. After closing and sealing the bottom end closure, the carton is transferred to the apparatus illustrated in FIG. 6 where the second horn 98 is located at a top end closure activating station, and the pressure pads in FIG. 9 are located at a top end closure clamping and sealing station indicated by reference numeral 81. Thus, the drawings illustrate apparatus for sequentially closing and sealing the bottom and top end closures of a tubular container. The tubular container with both ends opened are placed on the mandrel located at position A in FIG. 4 such that the opened bottom end closure 12 projects from the end 54a of the mandrel. The open end closure 12 is sequentially folded closed by the bottom breaker unit 56, and is engaged between the opposed work surfaces of the first horn 62 and mandrel 54 at the bottom end closure activating station at position C. The bottom end closure is clamped and sealed at the bottom end closure to clamping and sealing station indicated at position D in FIG. 5.

After closing and sealing of the bottom end closure in the illustrated apparatus, the top end closure is engaged by the prebreak unit 75 in FIG. 6, the container is filled, the layers to be sealed of the top end closure are engaged by the second horn 98 at the top end closure activating station as illustrated in FIG. 8, and the layers are clamped and sealed at the top end closure clamping and sealing station 81.

While specific forms of the invention have been illustrated in the accompanying drawings and described in the foregoing specification, it will be understood from those skilled in the art that the invention is not limited to the exact construction shown. To the contrary, various alterations in the construction and arrangement of parts, all falling within the scope and spirit of the invention, will be apparent to those skilled in the art.

I claim:

1. Apparatus for forming a seal between layers of a carton of thermoplastic coated paperboard material and the like wherein the thermoplastic material of the layers in the area to be sealed serves as the sealant and is activated by frictional heat from a vibration welding horn and then allowed to cool and set under pressure to form a seal between the layers, said apparatus comprising: means defining a sealant activating station at one location; means defining a clamping and sealing station at another location; back-up means located at each of said stations at least when a carton is located at the respective station; said back-up means having a work surface for engaging one outer surface of the layers in the area to be sealed; a horn located at said activating station that vibrates at a predetermined frequency when energized; said horn having a work surface for engaging the opposite outer surface of the layers in the area to be sealed and that opposes the work surface on the back-up means at the activating station; said horn and back-up means being movable with respect to each other at said activating station between a retracted inactive position and an extended active position in which the opposed work surfaces of the horn and back-up means engage the layers to be sealed in a clamping relationship such that vibration of said horn generates frictional heat to activate the thermoplastic material of said layers; a pressure pad located at said clamping and sealing station; said pressure pad having a work surface for engaging said opposite outer surface of the layers and that opposes the work surface of the back-up means at the clamping and sealing station; said pressure pad and back-up means being movable with respect to each other at said clamping and sealing station between a retracted inactive position and an extended active position in which the opposed work surfaces of the pressure pad and back-up means engage the layers to be sealed in a clamping relationship; said horn and back-up means being operable to move from the retracted inactive position to the extended active position when a carton is placed into the activating station and return to the retracted inactive position after remaining in the active position with the horn energized a predetermined period of time sufficient to activate the thermoplastic material; carton carrying means operable to carry a carton with activated thermoplastic from the activating station upon retraction of the horn and back-up means with respect to each other to the clamping and sealing station prior to cooling and setting of the activated thermoplastic; said pressure pad and back-up means being operable to move from the retracted inactive position to the extended active position when a carton with activated thermoplastic moves into the clamping and sealing station to clamp the layers with activated thermoplastic together and return to the retracted inactive position after remaining in the active position a predetermined period of time sufficient to permit the activated thermoplastic to cool and set.

2. Apparatus as claimed in claim 1 wherein said back-up means is movable between operable and inoperable position with respect to said horn.

3. Apparatus as claimed in claim 2 wherein said back-up means comprises a rotatable member having a plurality of radially extending arms, said arms being sequentially movable into operable positions with respect to said horn, and each of said arms in its operable position comprising a back-up member engageable with said one outer surface.

4. Apparatus as claimed in claim 3 wherein said horn is movable between retracted, inactive, and extended active positions with respect to the operable position of the back-up means.

5. Apparatus as claimed in claim 4 wherein said horn is reciprocably movable between said extended and retracted positions.

6. Apparatus as claimed in claim 5 wherein each of said arms comprises a mandrel for receiving a tubular carton of thermoplastic coated paperboard having a multiple layer substantially flat end closure, the end of said arm defining the work surface of said back-up means and corresponding in shape to the shape of the flat end closure of the carton for supporting the flat end closure of the carton to be engaged by the work surface of said horn.

7. Apparatus as claimed in claim 2 wherein said back-up means comprises an anvil having a work surface on the end thereof engageable with said one outer surface of the paperboard layers in the active position of the anvil and horn.

8. Apparatus as claimed in claim 7 wherein said anvil is mounted for reciprocable movement relative to said horn.

9. Apparatus as claimed in claim 8 wherein said horn is extendable and retractable relative to the extended position of said anvil.

10. Apparatus as claimed in claim 9 wherein said anvil and horn are located at an activating station, and further including conveying means for conveying thermoplastic paperboard cartons having layers to be welded together past said activating station such that the layers to be welded together pass between the work surface of said anvil and horn.

11. Apparatus as claimed in claim 10 further including power means for extending and retracting said anvil and horn with respect to each other.

12. Apparatus as claimed in claim 11 further including carton operated actuating means for said power means, said actuating means being located adjacent said conveyor means and engageable by cartons on said conveying means for actuating said anvil and horn to the extended active position when a carton is located at said activating station, and operable to actuate said anvil and horn to the retracted inactive positions when a carton is not located at said activating station.

13. A method of forming a seal between layers of a carton of thermoplastic coated paperboard material and the like wherein the thermoplastic material of the layers in the area to be sealed serves as the sealant and is activated by frictional heat from a vibration welding horn and then allowed to cool and set under pressure to form a seal between the layers, said method comprising: locating a vibrating horn having a work surface for engaging one outer surface of the layers at a activating station; locating a pressure pad at a clamping and sealing station spaced from the activating station; clamping the areas to be sealed between the work surface of the vibrating horn and the work surface of back-up means at the activating station to activate the thermoplastic material of said layers by the heat generated by the vibrating horn; unclamping the layers from between the work surfaces of the vibrating horn and back-up means at the activating station after the horn has vibrated a predetermined period of time to activate the thermoplastic material; moving the carton with the thermoplastic material in the activated state to the clamping and sealing station; clamping the layers to be sealed with the activated thermoplastic material between the work surfaces of the pressure pad and a back-up means located at the clamping and sealing station for a predetermined period of time to permit the thermoplastic material to cool and set and form a seal between the layers.

14. A method of forming a seal between layers of thermoplastic coated paperboard material and the like, said method comprising the steps of: clamping the layers between the opposed work surfaces of a vibrating horn and a back-up means for a predetermined period of time sufficient to cause the thermoplastic material to be thermally activated by the frictional heat generated by the vibrating horn; unclamping the layers from between the work surfaces of said horn and back-up means while the thermoplastic material is still in its activated state; moving the layers with the activated thermoplastic material to another location; and clamping the layers between opposed work surfaces at said another location for a predetermined period of time sufficient to permit the thermoplastic material to cool and set and form a seal between the layers.

15. A method of forming a seal between layers of an end closure of a carton of thermoplastic coated paperboard material and the like wherein the thermoplastic material of the layers in the area to be sealed serves as the sealant and is activated by frictional heat from a vibration welding horn and then allowed to cool and set under pressure to form a seal between the layers, said method comprising: locating a preclosing pad and back-up means at a preclosing station; locating a vibrating horn having a work surface for engaging one outer surface of the layers at an activating station; locating a clamping and sealing pressure pad at a clamping and sealing station spaced from the activating station; closing and pressing the layers of the end closure between the preclosing pad and back-up means at the preclosing station with a pressure sufficient to effect permanent set tending to maintain the end closure in its closed condition; clamping the areas to be sealed between the work surface of the vibrating horn and the work surface of back-up means at the activating station to activate the thermoplastic material of said layers by the heat generated by the vibrating horn; unclamping the layers from between the work surfaces of the vibrating horn and back-up means at the activating station after the horn has vibrated a predetermined period of time to activate the thermoplastic material; moving the carton with the thermoplastic material in the activated state to the clamping and sealing station; clamping the layers to be sealed with the activated thermoplastic material between the work surfaces of the pressure pad and a back-up means located at the clamping and sealing station for a predetermined period of time to permit the thermoplastic material to cool and set and form a seal between the layers.

16. Apparatus for closing and sealing the end closures of a tubular container of thermoplastic coated paperboard material or the like wherein the thermoplastic coating serves as the sealant and is activated by heat from a vibration welding horn and then allowed to cool and set under pressure to form a seal between the layers of the end closures, said apparatus comprising: a mandrel for receiving one of the tubular containers with both ends opened at a loading station such that the opened bottom end closure projects from the end of the mandrel; a bottom end closure breaker unit operable to fold and close the bottom end closure against the end of the mandrel such that the mandrel defines a back-up means and the end thereof defines a work surface engaging one surface of the bottom end closure; a bottom end closure sealant activating station at one location; a bottom end closure clamping and sealing station at another location; a bottom end closure horn located at said bottom end closure activating station that vibrates at a predetermined frequency when energized; said bottom end closure horn having a work surface for engaging the opposite outer surface of the bottom end closure; said bottom end closure horn and mandrel being movable with respect to each other at said bottom end closure activating station between a retracted inactive position and an extended active position in which the opposed work surfaces of the horn and mandrel engage the layers of the bottom end closure in a clamping relationship such that vibration of said bottom end closure horn generates frictional heat to activate the thermoplastic material of said bottom end closure layers; a bottom end closure pressure pad located at said bottom end closure clamping and sealing station; said bottom end closure pressure pad having a work surface for engaging the outer surface of the layers of the bottom end closure in opposed relationship with the work surface of said mandrel at said bottom end closure clamping and sealing station; said bottom end closure pressure pad and mandrel being movable with respect to each other at said bottom end closure clamping and sealing station between a retracted inactive position and an extended active position in which the opposed work surfaces of the bottom end closure pressure pad and mandrel engage the layers of the bottom end closure in a clamping relationship; said bottom end closure horn and back-up means being operable to move from the retracted inactive position to the extended active position when a container is located at the bottom end closure activating station and return to the retracted inactive position after remaining in the active position with the horn energized a predetermined period of time sufficient to activate the thermoplastic material of the bottom end closure; said mandrel being movable from the bottom end closure activating station after said predetermined period of time to carry the container with the activated thermoplastic upon retraction of said bottom end closure horn and mandrel with respect to each other to the bottom end closure clamping and sealing station; said bottom end closure pressure pad and mandrel being operable to move from the retracted inactive position to the extended active position when the container with the activated thermoplastic of the bottom end closure thereof moves into the bottom end closure clamping and sealing station to clamp the layers of the bottom end closure with activated thermoplastic together and return to the retracted inactive position after remaining in the active position a predetermined period of time sufficient to permit the activated thermoplastic to cool and set and form a seal between the layers of the bottom end closure.

17. Apparatus as claimed in claim 16 further including a top end closure sealant activating station at a location spaced from said bottom end closure clamping and sealing station; a top end closure clamping and sealing station at a location spaced from said top end closure sealant activating station; back-up means located at each of said top end closure stations at least when a container which is located at the respective top end closure station; said top end closure back-up means having a work surface for engaging one outer surface of the layers of the top end closure in the area to be sealed; a top end closure horn located at said top end closure activating station that vibrates a predetermined frequency when energized; said top end closure horn having a work surface for engaging the opposite outer surface of the layers of the top end closure; said top end closure horn and top end closure back-up means being movable with respect to each other at said top end closure activating station between a retracted inactive position and an extended active position in which the opposed work surfaces of the top end closure horn and top end closure back-up means engage the layers to be sealed in a clamping relationship such that vibration of said second horn generates frictional heat to activate the thermoplastic material of the layers of said top end closure; a top end closure pressure pad located at said top end closure clamping and sealing station; said top end closure pressure pad having a work surface for engaging said opposite outer surface of the layers of the top end closure; said top end closure pressure pad and back-up means being movable with respect to each other at said top end closure clamping and sealing station between a retracted inactive position and an extended active position in which the opposed work surfaces of the top end closure pressure pad and back-up means engage the layers of the top end closure to be sealed in a clamping relationship.

18. Apparatus as claimed in claim 17 further including means for moving a container from the bottom end closure clamping and sealing station to the top end closure activating station; said top end closure horn and top end closure back-up means being operable to move from the retracted inactive position to the extended active position when a container is placed into the top end closure activating station and return to the retracted inactive position after remaining in the active position with the top end closure horn energized a predetermined period of time sufficient to activate the thermoplastic material of the top end closure; carrying means operable to carry the container with the thermoplastic material of the top end closure in the activated state from the top end closure activating station upon retraction of the top end closure horn and top end closure back-up means with respect to each other to the top end closure clamping and sealing station prior to cooling and setting of the activated thermoplastic; said top end closure pressure pad and back-up means being operable to move from the retracted inactive position to the extended active position when the top end closure with activated thermoplastic moves into the top end closure clamping and sealing station to clamp the layers of the top end closure with activated thermoplastic together and return to the retracted inactive position after remaining in the active position a predetermined period of time sufficient to permit the activated thermoplastic to cool and set and form a seal between the layers of the top end closure.

19. Apparatus as claimed in claim 18 wherein at least one of the work surfaces of said bottom end closure pressure pad and mandrel is formed with staking protrusions for forming indentations in the bottom end closure layers at selected locations, and wherein at least one of the work surfaces of said top end closure pressure pad and mandrel is formed with staking protrusions for forming indentations in the top end closure layers at selected locations.

20. Apparatus as claimed in claim 18 further comprising a rotatable member having a plurality of radially extending arms, each of said arms defining one of said mandrels and being sequentially movable into operable positions with respect to said first horn.

21. Apparatus as claimed in claim 20 wherein said first horn is reciprocably movable between retracted, inactive, and extended active positions with respect to each of said arms in said bottom end closure activating station.

22. Apparatus as claimed in claim 20 wherein said top end closure back-up means comprises an anvil having a work surface on the end thereof engageable with layers of the top end closure in opposed relationship with said second horn at said top end closure activating station.

23. Apparatus as claimed in claim 22 wherein said anvil is mounted for reciprocable movement with respect to said second horn.

24. Apparatus as claimed in claim 23 wherein said second horn is extendable and retractable relative to the extended position of said anvil.

25. Apparatus as claimed in claim 1 wherein at least one of the work surfaces of said pressure pad and back-up means is formed with staking protrusions for forming indentations in the layers to be sealed at selected locations determined by the location of the protrusions on the work surface.

26. Apparatus as claimed in claim 1 including preclosing means spaced from said activating station for pressing the layers to be sealed to their closed condition prior to movement of the layers to said activating station.

* * * * *